United States Patent
Costes

(10) Patent No.: US 7,683,766 B2
(45) Date of Patent: Mar. 23, 2010

(54) METHOD AND DEVICE FOR LOCATING THE POSITION OF WHEELS OF A VEHICLE

(75) Inventor: Olivier Costes, Cugnaux (FR)

(73) Assignee: Continental Automotive France, Toulouse (FR)

( * ) Notice: Subject to any disclaimer, the term of this patent is extended or adjusted under 35 U.S.C. 154(b) by 487 days.

(21) Appl. No.: 11/708,566

(22) Filed: Feb. 21, 2007

(65) Prior Publication Data

US 2007/0200693 A1    Aug. 30, 2007

(30) Foreign Application Priority Data

Feb. 28, 2006    (FR) .................................. 06 01733

(51) Int. Cl.
   *G08B 21/18*    (2006.01)
(52) U.S. Cl. .................. 340/438; 340/442; 340/426.33; 116/34 R
(58) Field of Classification Search ................. 340/438, 340/425.5

See application file for complete search history.

(56) References Cited

U.S. PATENT DOCUMENTS

2005/0033485 A1    2/2005  Nimmo

FOREIGN PATENT DOCUMENTS

| DE | 102 26 995 | 5/2004 |
| EP | 1 477 335 | 11/2004 |
| WO | WO 02/051654 | 7/2002 |

*Primary Examiner*—Brian A Zimmerman
*Assistant Examiner*—Sara Samson
(74) *Attorney, Agent, or Firm*—Young & Thompson

(57) ABSTRACT

Method of locating the position of wheels (2-5) of a vehicle (1) equipped with an electronic module (6-9) and with transmitting antennas (12-14) positioned in such a way as to present a coverage area in which at least one wheel (2-5) is located. Furthermore, n successive transmissions are ordered, by each transmitting antenna, of an identification request signal, and the number of identification request signals received by each electronic module (6-9) is counted. Furthermore, a ratio representative of the number of counted identification request signals received by each electronic module (6-9) is calculated, relative to the number of identification request signals actually transmitted by the transmitting antenna (12-14), and an indication of presence of the electronic module in the coverage area of the transmitting antenna is provided when the calculated ratio is greater than a predetermined threshold value.

11 Claims, 2 Drawing Sheets

METHOD AND DEVICE FOR LOCATING THE POSITION OF WHEELS OF A VEHICLE

FIELD OF THE INVENTION

The invention relates to a method and a device for locating the position of wheels of a vehicle equipped with an electronic module designed to transmit, to a central processing unit mounted on the vehicle, signals representative of operating parameters of each wheel comprising, in addition, an identification code of the latter.

BACKGROUND OF THE INVENTION

More and more motor vehicles have, for safety purposes, monitoring systems comprising sensors mounted on each of the wheels of the vehicle, dedicated to measuring parameters, such as pressure or temperature of the tires fitted on these wheels, and intended to inform the driver of any abnormal change in the measured parameter.

These monitoring systems are conventionally provided with a sensor mounted on each wheel of the vehicle and comprising a microprocessor and a radio frequency transmitter (or RF transmitter), and a central processing unit for receiving the signals transmitted by the transmitters, comprising a computer incorporating a radio frequency receiver (or RF receiver) connected to an antenna.

One of the problems that has to be resolved with such monitoring systems lies in the obligation to have to associate, with each signal received by the receiver of the central processing unit, an indication concerning the location of the sensor and therefore of the wheel originating this signal, this obligation lasting throughout the life of the vehicle, that is, having to be respected even after wheel changes or, more simply, after the positions of these wheels have been reversed.

At the present time, a first locating method consists in using three low-frequency antennas, each positioned in the vicinity of one of the wheels of the vehicle, and in performing a locating procedure consisting in successively exciting each of these three antennas by transmitting a low-frequency magnetic field.

According to this procedure, the sensor mounted on the wheel located in the vicinity of the excited antenna orders, in response to and for the central processing unit, the transmission of a low-frequency signal comprising an identification code of said sensor, in such a way that the successive excitation of the three antennas leads to the locating of the three sensors mounted on the wheels next to these antennas, and, by deduction, to the locating of the fourth sensor.

The main advantage of such a method lies in the fact that the locating procedure is very fast and results in virtually instantaneous locating after the vehicle has been started up.

However, this solution requires the vehicle to be fitted with three antennas with all the attendant constraints: connecting cables, command amplifiers, etc., such that it proves costly.

This drawback concerning the cost of installation of the means of implementing the locating method can be resolved when the vehicle is fitted with a hands-free access device intended to allow access to said vehicle and the latter to be started up.

In practice, the solution then consists, as in particular described in patent application WO 02/051654, in using the transmitting antennas of this hands-free access device mounted on the vehicle to implement the wheel locating procedure.

As described in the abovementioned patent application, implementing this solution involves, for example, ordering the transmission by the transmitting antennas of an uncoded signal when said antennas are used to locate the wheels, and in ordering the transmission of a coded signal when using these antennas for their original vehicle access control purpose.

Such a theoretically very seductive solution does, however, prove very difficult to implement in practice. In practice, the antennas of the hands-free access devices are not positioned ideally to allow for the locating of the wheels of a vehicle.

Because of this, and firstly, the selective nature of this locating procedure can be obtained only through very accurate settings of the antenna transmitting power, and normally requires the sensitivity of the receivers mounted on the wheels to be increased, consequently sensitizing these sensors to external disturbances.

In practice, these extreme setting conditions often lead to problems of noise immunity and sensitivity tolerance of the sensors, resulting in a very relative reliability of the locating method.

OBJECTS OF THE INVENTION

The present invention seeks to overcome this drawback linked to the reliability failing of the locating method described above, and its main objective is to provide a locating method that is very powerful in terms of responsiveness and reliability.

Another object of the invention is to provide a locating method that further requires, for its implementation, a simple software adaptation of the conventional hands-free access devices that are fitted on the current vehicles.

Another objective of the invention is to provide a locating method which does not affect the life span of the on-board electrical power supply means in the electronic modules.

SUMMARY OF THE INVENTION

To this end, the invention aims at a method of locating the position of wheels of a vehicle equipped with an electronic module designed to transmit, to a central processing unit mounted on the vehicle, signals representative of operating parameters of each wheel comprising, in addition, an identification code of the latter, said locating method consisting in equipping the vehicle with transmitting antennas each positioned in such a way as to present a coverage area in which at least one wheel is located.

According to the invention, this locating method consists in applying a locating procedure according to which, in succession for each of the transmitting antennas:

the central processing unit orders n successive transmissions, by said transmitting antenna, of an identification request signal, each electronic module counts the number of identification request signals received by said electronic module, and, on an ad-hoc basis, orders the transmission of at least one counting signal incorporating the number m of said identification request signals received, and the central processing unit is programmed, for each electronic module, to:

calculate a ratio representative of the number of counted identification request signals received by said electronic module compared to the number of identification request signals actually transmitted by the transmitting antenna, and providing an indication of presence of said electronic module in the coverage area of the transmitting antenna, when the calculated ratio is greater than a predetermined threshold value.

The locating method according to the invention therefore consists, firstly, in ordering the transmission, by each transmitting antenna, of a plurality of identification request signals, in such a way that, statistically, each electronic module located in the coverage area of this transmitting antenna is necessarily invoked by an identification request.

Furthermore, each electronic module is adapted, not to respond systematically on receiving an identification request signal, but to increment a counter and order the ad-hoc transmission of a counting signal representative of the number of said identification request signals actually received.

According to this principle, the selective nature of the locating procedure results from the fact that:
- only the electronic modules located in the coverage area of a transmitting antenna receive a number of identification request signals likely to lead to their identification,
- the reception, by an electronic module located outside the coverage area of a transmitting antenna, of "stray" identification request signals has no effect, because these "stray" signals are automatically "filtered out".

Because of this, such a locating method makes it possible to work with high levels of sensitivity of the receivers mounted on the wheels while ensuring an insensitivity to the "stray" signals and to external electromagnetic interferences, this arrangement advantageously resulting, in practice, in a locating method that is very powerful in terms of responsiveness and reliability being obtained.

Furthermore, regarding the electronic modules, this locating method requires only a simple software adaptation of the operation of the latter, intended to make it possible to manage the counting of the identification request signals, and the transmission of the counting signals.

Furthermore, one of the consequences resulting from the specific features of the method according to the invention lies in the possibility of advantageously using the antennas of a hands-free access device designed to allow access to a vehicle and for the latter to be started up, through a simple software adaptation of this hands-free access device consisting, in particular, in programming the central processing unit so as to adapt the latter to implement the locating method according to the invention.

Assuming that, in a usual manner that is known per se, each electronic module is programmed to transmit periodically, in a so-called "pre-running" phase following a vehicle start-up, an identification signal incorporating the identification code of the wheel, the method according to the invention can advantageously consist in incorporating the counting data in each of said identification signals.

Thus, the locating method does not require the electronic modules to transmit specific signals dedicated to the locating procedure, such that it does not affect the life of the on-board electrical power supply means in said electronic modules.

According to an advantageous variant of embodiment of the method according to the invention, the central processing unit is programmed to order ad hoc transmissions of the counting signals by the electronic modules.

According to this principle, the locating procedure requires the transmission of specific signals transmitted by the electronic modules. However, the number of counting signals required is very low, so their effect on the life span of the on-board electrical power supply means in the electronic modules is negligible.

Moreover, according to a first advantageous variant of embodiment of the locating method according to the invention, the central processing unit is programmed, for each transmitting antenna, to calculate the ratio at the end of the n transmissions of the identification request signal.

According to a second advantageous variant of embodiment of the locating method according to the invention, the central processing unit can also be programmed, for each transmitting antenna, to perform at least one intermediate ratio calculation, and to order the interruption of the n transmissions of the identification request signal when said calculated intermediate ratio is greater than the predetermined threshold value.

This second variant of embodiment makes it possible, in practice, to shorten the transmission time, by each transmitting antenna, of the identification request signals, and therefore leads to an overall reduction in the duration of the locating procedure.

According to another advantageous embodiment of the method according to the invention, on each switchover between two transmitting antennas, the central processing unit is programmed to transmit a signal to reset the counting of the identification request signals received by the electronic modules.

This embodiment makes it possible, essentially, to manage the applications whereby at least one electronic module is located in the coverage area of two transmitting antennas used successively in the locating procedure.

BRIEF DESCRIPTION OF THE DRAWINGS

Other characteristics, objects and advantages of the invention will become apparent from the detailed description that follows, with reference to the appended drawings which represent a preferred embodiment thereof, as a nonlimiting example. In these drawings.

DETAILED DESCRIPTION OF THE INVENTION

Figure 1:
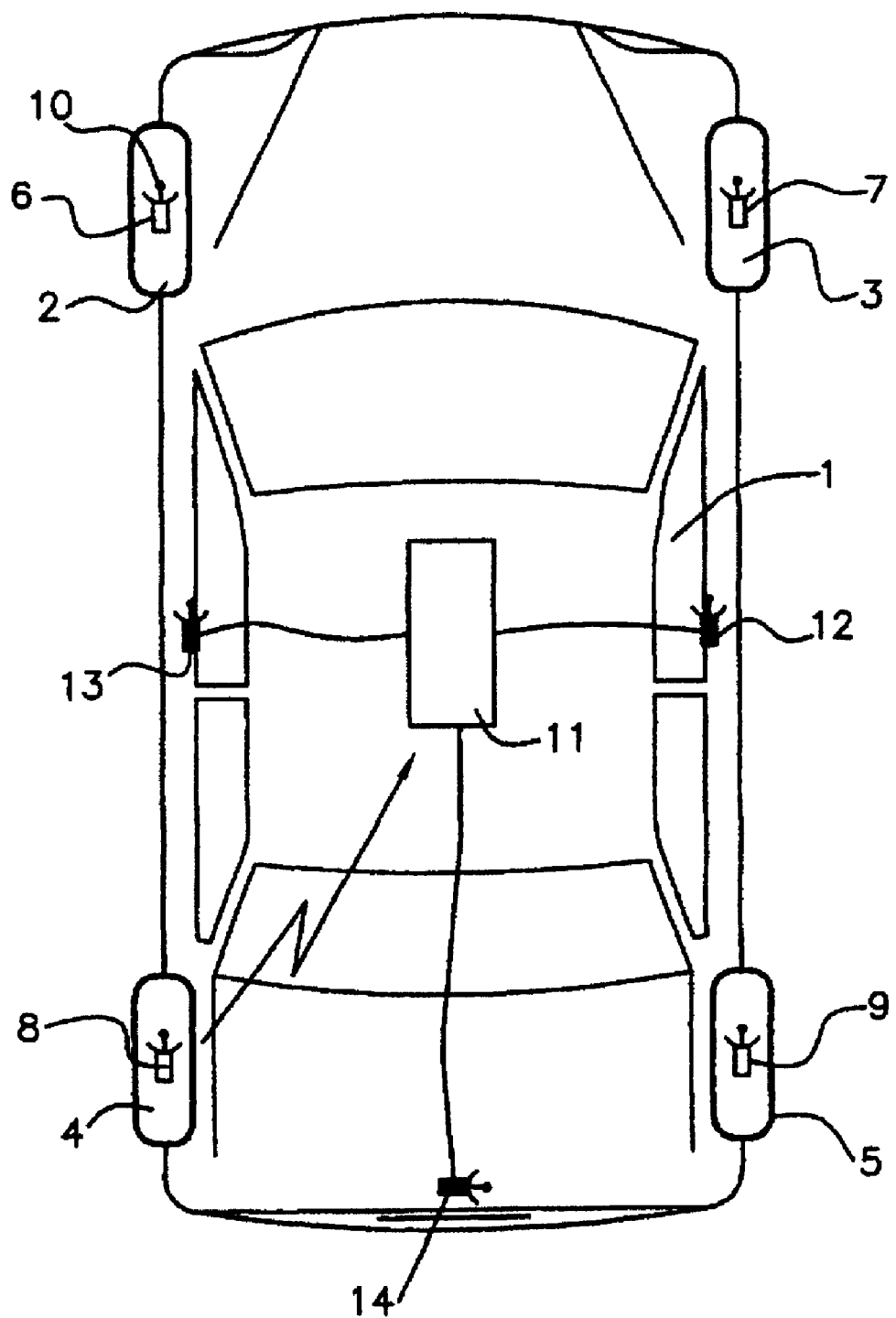
FIG. 1 is a diagrammatic top view of a vehicle provided with a monitoring system associated with a device according to the invention for locating the four wheels of said vehicle.

The locating device according to the invention represented by way of example in FIG. 1 is intended to locate the position of wheels of a vehicle.

This locating device is more specifically intended to be installed on vehicles provided with a monitoring system such as that, represented in FIG. 1, fitted on a vehicle 1 provided with four wheels conventionally clad with a tire: two front wheels 2, 3 and two rear wheels 4, 5.

Such monitoring systems conventionally comprise, firstly, associated with each wheel 2-5, an electronic module 6-9, for example attached to the rim of said wheel so as to be positioned inside the enclosure of the tire.

Each of these electronic modules 6-9 incorporates, for example, sensors dedicated to measuring parameters, such as pressure and/or temperature of the tire, connected to a microprocessor having an identification code of said module, and linked to an RF transmitter connected to a low-frequency antenna such as 10.

The monitoring system also comprises a centralized computer or central processing unit 11 comprising a microprocessor and incorporating an RF receiver designed to receive the signals transmitted by each of the four electronic modules 6-9.

Usually, such a monitoring system and, in particular, its central processing unit 11, are designed to inform the driver of any abnormal variation in the parameters measured by the sensors associated with the wheels 2-5.

The locating device according to the invention also comprises transmitting antennas 12-14 connected to the central processing unit 11 and each positioned in the vicinity of a left pair of wheels 2, 4, right pair of wheels 3, 5 or rear pair of wheels 4, 5.

According to the locating device represented in FIG. 1, these transmitting antennas 12-14 are made up of antennas of a device usually known as a hands-free access device, designed to allow access to the vehicle 1 and, where appropriate, the latter to be started up by the identification of an electronic badge.

According to the provisions of such a hands-free access device, there can, as represented in FIG. 1, be three of these antennas, respectively consisting of:

- a right antenna 12 positioned on the handle of the front right door of the vehicle,
- a left antenna 13 positioned on the handle of the front left door of the vehicle,
- and a rear antenna 14 positioned on the handle of the boot lid of the vehicle.

Figure 2:
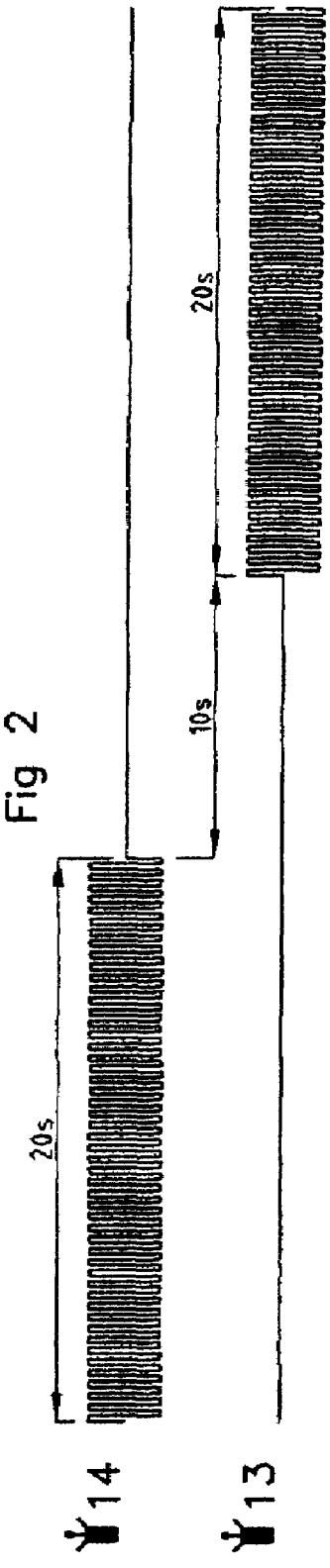
FIG. 2 is a block diagram illustrating the progress of a locating procedure implemented according to the method of the invention.
Figure 2:
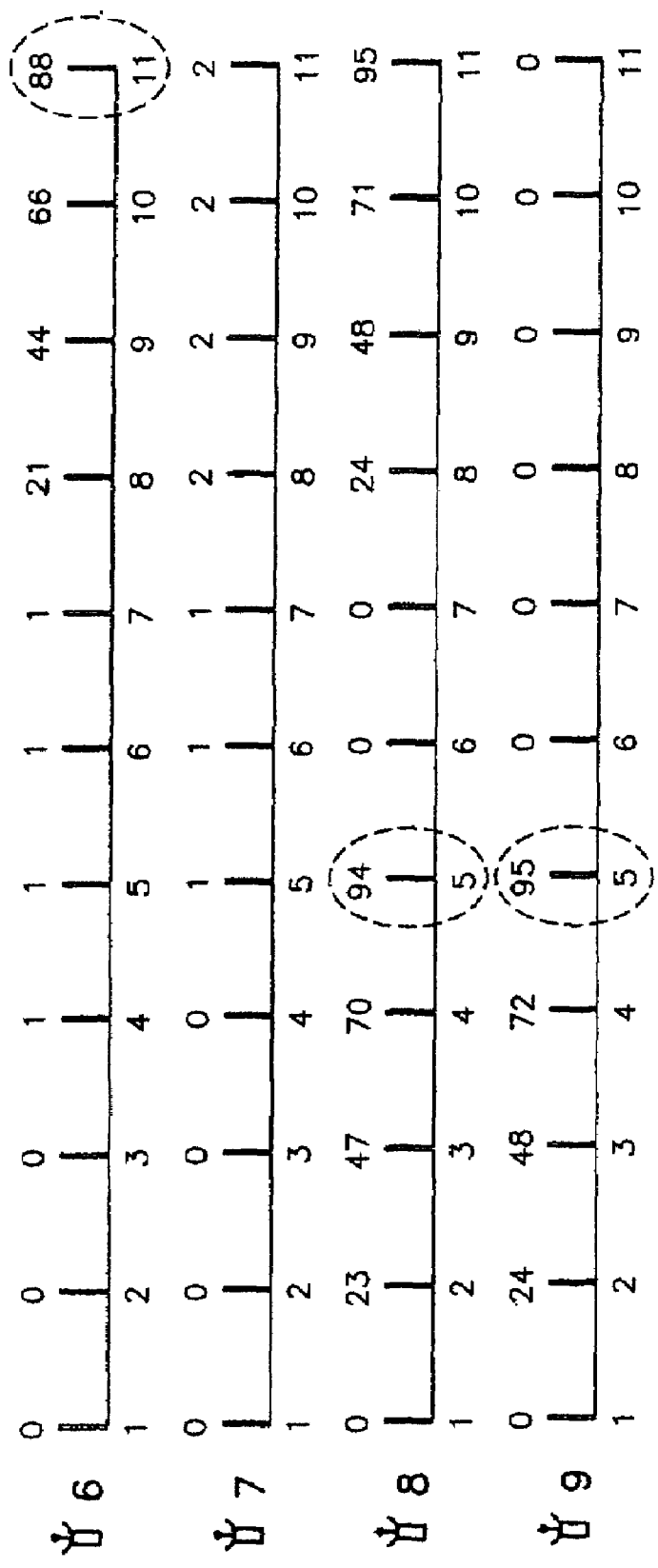

FIG. 2 illustrates an exemplary locating procedure implemented by means of the locating device described above, consisting in using in succession two antennas, in the example the rear antenna 14 then the left antenna 13, to transmit identification request signals.

According to this locating procedure, the central processing unit 11 orders the transmission by each transmitting antenna 13, 14 of a hundred identification request signals transmitted at a frequency of five signals per second, such that the transmitting time of each of said transmitting antennas is equal to twenty seconds. Naturally, the numeric values specified above can be modified without in any way departing from the framework of the present invention.

Furthermore, and as illustrated in FIG. 2, the switchover between the two transmitting antennas 14, 13 leads to a usual "floating" period with a duration of the order of ten seconds, resulting from conventional hardware contingencies known per se.

Thus, the overall duration of the locating procedure has a value of the order of fifty seconds.

According to the locating procedure according to the invention, each of the electronic modules 6-9 is programmed to:

- count the identification request signals actually received by said electronic module, by incrementing a counter,
- and transmit, at intervals of five seconds, data frames incorporating, on the one hand, the identification code of the corresponding wheel 2-5, and on the other hand, according to the invention, the counted value.

It should be noted that each interval of five seconds corresponds to the conventional transmission interval with which, currently, the electronic modules 6-9 are programmed to transmit data frames incorporating the identification code, in an initial so-called "pre-running" phase, occurring after said electronic modules have switched between a "standby" state corresponding to a stopped state of the vehicle 1, and an "activated" state triggered on detecting a start-up of said vehicle.

Finally, according to the locating procedure according to the invention, the central processing unit 11 is programmed, in terms of the overall transmission period of each transmitting antenna 14, 13, and for each electronic module 6-9:

- to calculate a ratio representative of the number of counted identification request signals received by said electronic module relative to the number of identification request signals (in the example, one hundred signals) actually transmitted by the transmitting antenna 14, 13,
- and to provide an indication of presence of said electronic module in the coverage area of the transmitting antenna 14, 13, when the calculated ratio is greater than a predetermined threshold value.

Furthermore, this central processing unit 11 is also programmed to order a reset of the count of the identification request signals received by the electronic modules 6-9, on each switchover between the transmitting antennas, in the example on the switchover between the transmitting antennas 14 and 13.

According to the example represented in FIG. 2, such a locating procedure leads:

- at the end of the transmission of the identification request signals by the rear antenna 14, to determining that the electronic modules 8 and 9 are fitted on the rear wheels 4 and 5 of the vehicle 1,
- and at the end of the transmission of the identification request signals by the left antenna 13, to determining that the electronic modules 6 and 8 are fitted on the left wheels 2 and 4 of the vehicle 1.

Based on this data, the central processing unit 11 can:

- directly determine that the electronic module 8 is fitted on the left rear wheel 4 of the vehicle 1,
- deduce from this first location, respectively, that the electronic module 6 is fitted on the front left wheel 2 of the vehicle 1, and that the electronic module 9 is fitted on the right rear wheel 5 of the vehicle 1,
- and finally, deduce from the previous locations, that the remaining electronic module 7 is fitted on the front right wheel 3 of the vehicle 1.

The invention claimed is:

1. Method of locating the position of wheels (2-5) of a vehicle (1) equipped with an electronic module (6-9) designed to transmit, to a central processing unit (11) mounted on the vehicle (1), signals representative of operating parameters of each wheel comprising, in addition, an identification code of the latter, said locating method consisting in equipping the vehicle (1) with transmitting antennas (12-14) each positioned in such a way as to present a coverage area in which at least one wheel (2-5) is located, and being characterized in that it consists in applying a locating procedure according to which, in succession for each of the transmitting antennas (12-14):

- the central processing unit (11) orders n successive transmissions, by said transmitting antenna, of an identification request signal,
- each electronic module (6-9) counts the number of identification request signals received by said electronic module, and, on an ad-hoc basis, orders the transmission of at least one counting signal incorporating the number m of said identification request signals received,
- and the central processing unit (11) is programmed, for each electronic module (6-9), to:
  - calculate a ratio representative of the number of counted identification request signals received by said electronic module compared to the number of identification request signals actually transmitted by the transmitting antenna (12-14),
  - and providing an indication of presence of said electronic module in the coverage area of the transmitting antenna (12-14), when the calculated ratio is greater than a predetermined threshold value.

2. Locating method according to claim 1, in which each electronic module (6-9) is programmed to transmit periodically, in a pre-running phase following a vehicle start-up, an identification signal incorporating the identification code of the wheel (2-5), characterized in that it consists in incorporating the counting data in each of said identification signals.

3. Locating method according to claim 1, characterized in that the central processing unit (11) is programmed to order ad hoc transmissions of the counting signals by the electronic modules (6-9).

4. Locating method according to claim 2, characterized in that, for each transmitting antenna (12-14), the central processing unit is programmed to calculate the ratio at the end of the n transmissions of the identification request signal.

5. Locating method according to claim 2, characterized in that, for each transmitting antenna (12-14), the central processing unit (11) is programmed to perform at least one intermediate ratio calculation, and to order the interruption of the n transmissions of the identification request signal when said calculated intermediate ratio is greater than the predetermined threshold value.

6. Locating method according to claim 1, characterized in that, on each switchover between two transmitting antennas (12-14), the central processing unit (11) is programmed to transmit a signal to reset the counting of the identification request signals received by the electronic modules (6-9).

7. Locating method according to claim 1, characterized in that the antennas (12-14) of a hands-free access device fitted on the vehicle (1), designed to allow access to said vehicle and to start the latter, are used in the locating procedure.

8. Locating method according to claim 3, characterized in that, for each transmitting antenna (12-14), the central processing unit is programmed to calculate the ratio at the end of the n transmissions of the identification request signal.

9. Locating method according to claim 3, characterized in that, for each transmitting antenna (12-14), the central processing unit (11) is programmed to perform at least one intermediate ratio calculation, and to order the interruption of the n transmissions of the identification request signal when said calculated intermediate ratio is greater than the predetermined threshold value.

10. Locating method according to claim 3, characterized in that, on each switchover between two transmitting antennas (12-14), the central processing unit (11) is programmed to transmit a signal to reset the counting of the identification request signals received by the electronic modules (6-9).

11. Locating method according to claim 3, characterized in that the antennas (12-14) of a hands-free access device fitted on the vehicle (1), designed to allow access to said vehicle and to start the latter, are used in the locating procedure.

* * * * *